United States Patent
Johnson et al.

(10) Patent No.: US 6,585,468 B2
(45) Date of Patent: Jul. 1, 2003

(54) CAPTIVATED FASTENER ASSEMBLY WITH POST-FORMED RETENTION FEATURE AND METHOD FOR FORMING THE SAME

(75) Inventors: H. Thad Johnson, 9002 Hidden Trail, Davisburg, MI (US) 48350; Michael J. Draper, Perry, MI (US)

(73) Assignee: H. Thad Johnson, Davisburg, MI (US)

(*) Notice: Subject to any disclaimer, the term of this patent is extended or adjusted under 35 U.S.C. 154(b) by 0 days.

(21) Appl. No.: 09/775,485

(22) Filed: Feb. 2, 2001

(65) Prior Publication Data

US 2002/0150443 A1 Oct. 17, 2002

(51) Int. Cl.$^7$ .......................... F16B 21/18; B23P 11/00
(52) U.S. Cl. ..................... 411/353; 411/361; 411/533; 411/999; 29/437; 29/510
(58) Field of Search .................................. 411/352, 353, 361, 383, 999, 533; 29/437, 510, 511, 517

(56) References Cited

U.S. PATENT DOCUMENTS

| | | |
|---|---|---|
| 1,572,770 A | 2/1926 | Colley |
| 2,374,743 A | 5/1945 | Granville |
| 2,931,412 A | 4/1960 | Wing |
| 3,008,368 A | 11/1961 | Hammitt et al. |
| 3,083,796 A | 4/1963 | Bell, Jr. |
| 3,090,203 A | 5/1963 | Durget |
| 3,137,195 A | 6/1964 | Rosenberg |
| 3,217,774 A | 11/1965 | Pelochino |
| 3,221,847 A | 12/1965 | Attwood |
| 3,262,480 A | 7/1966 | Storch |
| 3,447,229 A | 6/1969 | Clark |
| 3,452,636 A | 7/1969 | Cohen et al. |
| 4,309,123 A | 1/1982 | Moore |
| 4,334,599 A | 6/1982 | Ritsema et al. |
| 4,435,112 A | 3/1984 | Becker |
| 4,607,992 A | 8/1986 | Mauritz et al. |
| 4,732,519 A | 3/1988 | Wagner |
| 4,971,497 A | 11/1990 | Stoffer et al. |
| 4,979,858 A | 12/1990 | Van Allman et al. |
| 4,995,777 A | * 2/1991 | Warmington .............. 411/361 |
| 5,094,579 A | 3/1992 | Johnson |
| 5,141,357 A | 8/1992 | Sherman et al. |
| 5,154,559 A | 10/1992 | Wagner |
| 5,199,152 A | 4/1993 | Wagner |
| 5,209,620 A | 5/1993 | Zare-Ardestani |
| 5,328,311 A | 7/1994 | Knohl |
| 5,395,194 A | 3/1995 | Johnson et al. |
| 5,662,444 A | 9/1997 | Schmidt, Jr. |
| 5,711,711 A | 1/1998 | Schmidt, Jr. |
| 5,807,052 A | * 9/1998 | Van Boven et al. ........ 411/353 |
| 6,044,536 A | * 4/2000 | Schneider ............... 411/353 X |
| 6,309,157 B1 | 10/2001 | Amann et al. |

FOREIGN PATENT DOCUMENTS

| | | |
|---|---|---|
| DE | 3706616 | 9/1988 |
| GB | 855297 | 11/1960 |
| GB | 929149 | 6/1963 |

* cited by examiner

Primary Examiner—Neill Wilson
(74) Attorney, Agent, or Firm—Harness, Dickey & Pierce, P.L.C.

(57) ABSTRACT

A captivated fastener assembly is provided along with a technique for captivating a fastener in a workpiece. The assembly includes a fastener having a head, a shank extending from said head that has an upper unthreaded shank portion and a lower threaded shank portion, wherein the diameter of the outer tips of the threads of the lower threaded shank portion exceed the diameter of the upper unthreaded shank portion. The assembly further includes a workpiece having a sleeve with an internal bore with a diameter slightly larger than the diameter of the fastener shank so that the sleeve can be received over the shank. The sleeve also includes segments that deform inwardly in response to a predetermined compressive force, thereby forming a plurality of deformed segments that protrude inwardly. Thus, the plurality of deformed segments provide an inner diameter that is less than the diameter of the outer tips of the threads of the lower threaded shank portion, thereby holding the fastener captive.

13 Claims, 4 Drawing Sheets

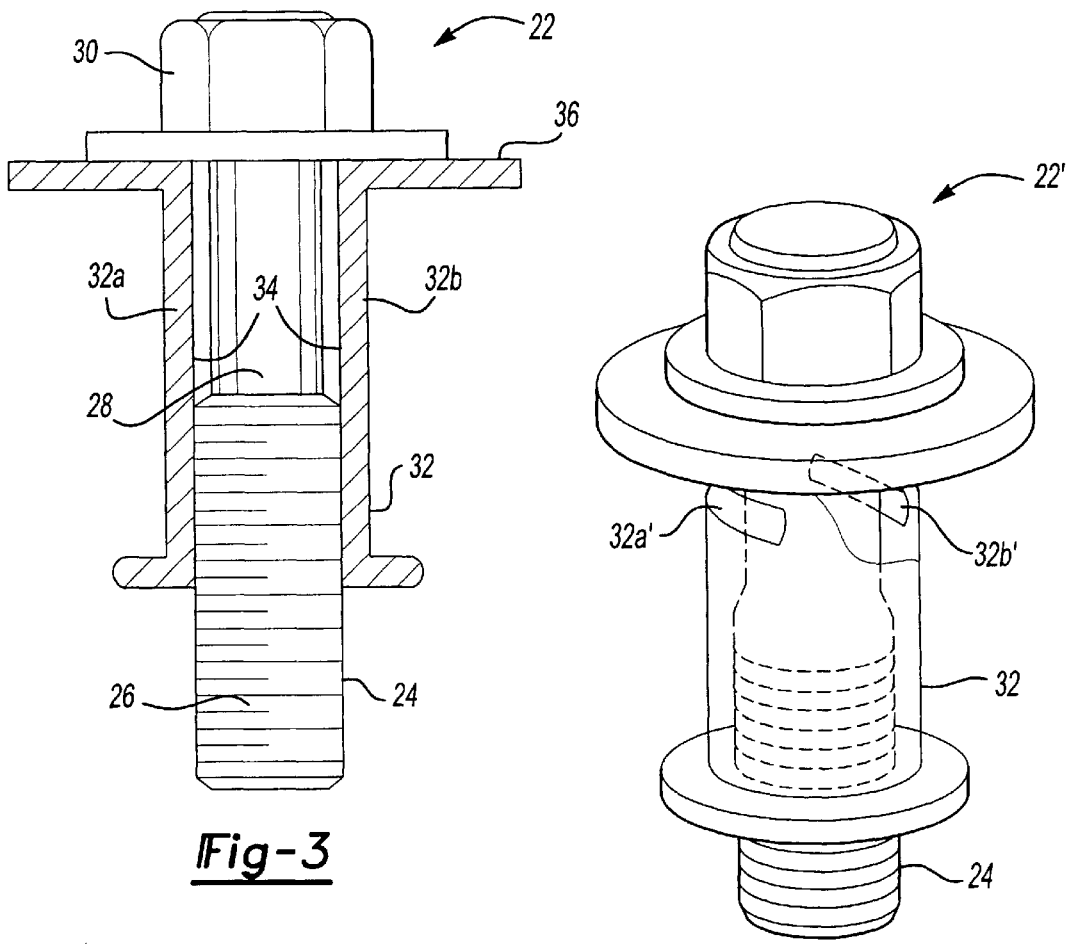
Fig-3
Fig-4
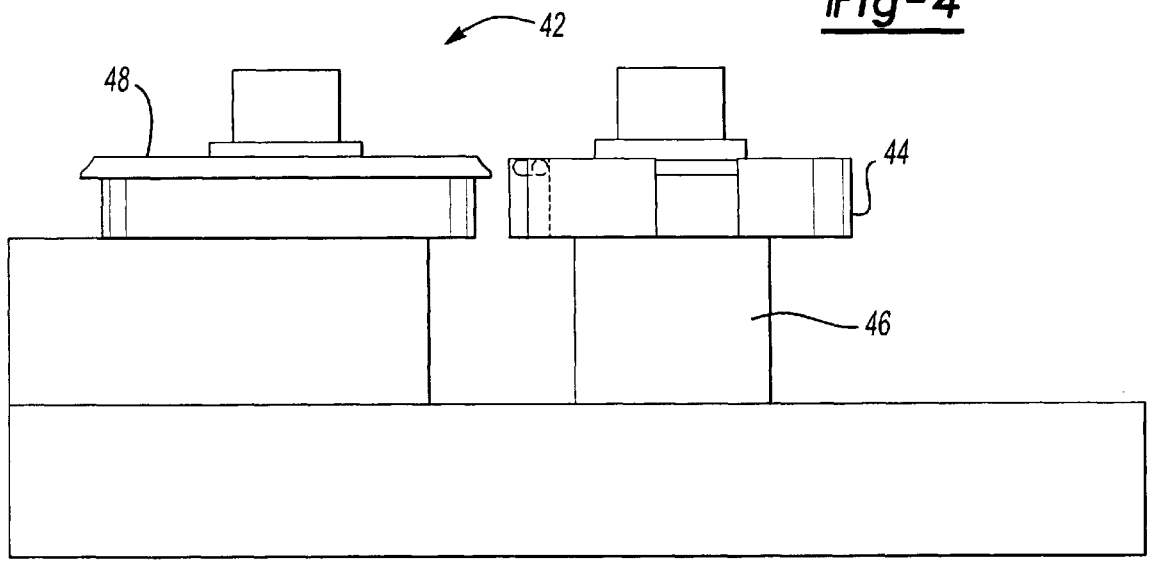
Fig-5

CAPTIVATED FASTENER ASSEMBLY WITH POST-FORMED RETENTION FEATURE AND METHOD FOR FORMING THE SAME

FIELD OF THE INVENTION

This invention relates to threaded fastener assemblies and, more particularly, to assemblies in which the fastener is captivated within the workpiece.

BACKGROUND OF THE INVENTION

A common goal among manufacturers is to increase productivity by reducing the production time of an assembly process. In an effort to achieve this goal, captivated fastener assemblies are often employed. Such captivated fastener assemblies utilize fasteners which can be pre-attached to a workpiece that later is fastened to a support structure during the assembly process. Because attempts to find lost or misplaced screws are both inconvenient and time consuming, captivated fastener assemblies are used to help reduce the production time of an assembly process and wasted worker effort that is caused by searching for these lost or misplaced screws. In addition, captivated fastener assemblies can ease workpiece installation processes by holding the fastener within the workpiece in proper position to allow a worker to expediently secure the workpiece to the support structure.

Many captivated fastener assemblies have previously been designed in which the fastener is retained within the washer to prevent separation. FIGS. 1 and 2 illustrate a known captivated fastener assembly which is used to secure a valve cover (not shown) to an engine cylinder head (not shown). The assembly 10 generally includes three pieces: fastener 12, sleeve 14 and grommet 16. It is necessary that the fastener 12 be able to slide axially within the bore of the sleeve 14. On the other hand, it is also important that the assembly 10 remain assembled and not fall apart during shipment or when the cover is mounted to the engine cylinder head. Thus, there is a requirement that the fastener 12 be captivated within the workpiece. A common commercially used design for accomplishing these goals employs a protuberance, such as enlarged ring 18, formed on the fastener shank which cooperates with a reduced diameter section 20 formed in the sleeve 14. The outer diameter of the ring 18 and inner diameter defined by the sleeve section 20 are such that the fastener can be pushed through the sleeve so that the ring 18 falls below section 20 yet there still remains a sufficient interference between the ring 18 and section 20 to prevent the ring (and thus the fastener) from again passing upwardly past section 20 which otherwise would permit separation of the fastener 12 from the sleeve 14.

The captivated fastener assembly disclosed in U.S. Pat. No. 4,732,519 employs a similar type of the above-mentioned arrangement. The captivated fastener assembly disclosed in this patent includes a fastener, washer, and grommet. A protuberance in the form of a set of wings projects from the shank of the fastener and cooperates with a washer sleeve. The washer sleeve includes an inwardly projecting annular bead portion pre-formed at the top of the sleeve. The wings of the fastener shank are designed to provide an outer diameter that is larger than the inner diameter of the annular bead portion of the sleeve. The fastener is captivated within the washer by forcing the wings of the fastener past the annular bead portion to provide an interference fit, thereby preventing the upward removal of the fastener.

In general, the afore-mentioned captivated fastener assemblies require special steps for forming both the fastener and the washer. For example, the fastener is typically formed by a special thread rolling process. A forging process is normally needed to form the protuberance.

It is very important that tight tolerances be kept during the forming processes. If the difference between the relative diameters is too large, then it could be very difficult or impossible to insert the fastener into the washer sleeve. In contrast, if the diameter of the protuberance of the fastener is too small, then the assembly could become inadvertently separated.

Furthermore, since the captivation process in these types of prior art examples requires that the fastener be forcibly inserted into an aperture, the fastener may axially elongate the grains of the material at the sleeve aperture surface. This action generates an undesirable axially oriented tensile stress gradient in the surface grains. These tensile stress gradients tend to decrease the ductility and fatigue life of the material at the sleeve aperture surface. This method may also cause deformation of portions of the fastener, such as the threads, thereby limiting its fastening effectiveness.

Therefore, it would be desirable to provide a captivated fastener assembly that overcomes one or more of these problems.

SUMMARY OF THE INVENTION

Accordingly, it is an object of the present invention to provide an assembly in which the fastener is captivated within the workpiece without the need for a distinct outward protuberance on the fastener shank. Thus, a conventional threaded fastener can be used with a workpiece having a deformable sleeve, yet the same goal obtained. The captivation of the fastener is obtained by employing the deformable workpiece sleeve which, before deformation, accepts the shank of the fastener and slides freely along the shank. After the workpiece is slid over the fastener, a plurality of deformed segments are created by applying an inward compressive force to the outside of portions of the sleeve. The inner diameter provided by the deformed segments remains greater than the diameter of the unthreaded portion of the fastener such that a free-flowing fit between the deformed segments and the unthreaded portion of the fastener is provided. Therefore, the fastener is able to move axially relative to the workpiece. However, the inner diameter provided by the deformed segments is less than the outer diameter of the threaded portion of the fastener. Thus, the outer tips of the threads engage the deformed segments if the fastener moves too far upwardly, thereby preventing the fastener from being removed from the workpiece.

BRIEF DESCRIPTION OF THE PREFERRED EMBODIMENTS

FIG. 3 is a cross-sectional view of a preferred fastener assembly made in accordance with the teachings of the present invention before retention forming procedures;

FIG. 4 is a perspective view of the fastener assembly of FIG. 3 following retention forming procedures;

FIG. 5 is a side view of a preferred fastener captivating apparatus according to the teachings of the present invention;

DETAILED DESCRIPTION OF THE PREFERRED EMBODIMENTS

It should be noted from the outset that while this invention will be described in connection with the best mode currently contemplated for practicing the invention, that various other modifications can be made without departing from the spirit and scope of the invention. Therefore, the foregoing specific embodiments should not be construed as being a limiting example of the invention.

Figure 1:
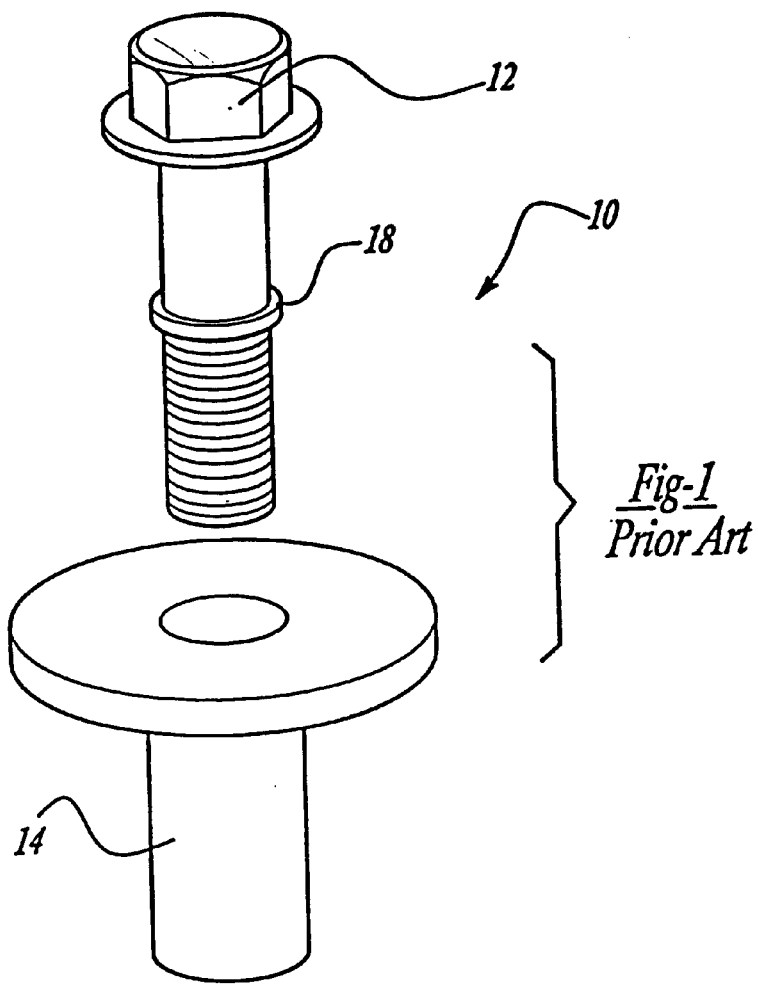
FIG. 1 is a perspective unassembled view of a prior art captivated fastener assembly that employs pre-formed retention features.

FIG. 3 illustrates a preferred fastener assembly to be used in accordance with the principles of the present invention. As shown in FIG. 3, the fastener assembly 22 has not undergone any captivation procedures. The fastener 24 does not require the protuberance 18 of the prior art of FIG. 1. Instead, fastener 24 is of a conventional design which is economical to produce. Fastener 24 includes a threaded portion 26 on the lower portion of the shank and an unthreaded portion 28 of reduced diameter on the upper portion of the shank below the head 30.

Figure 2:
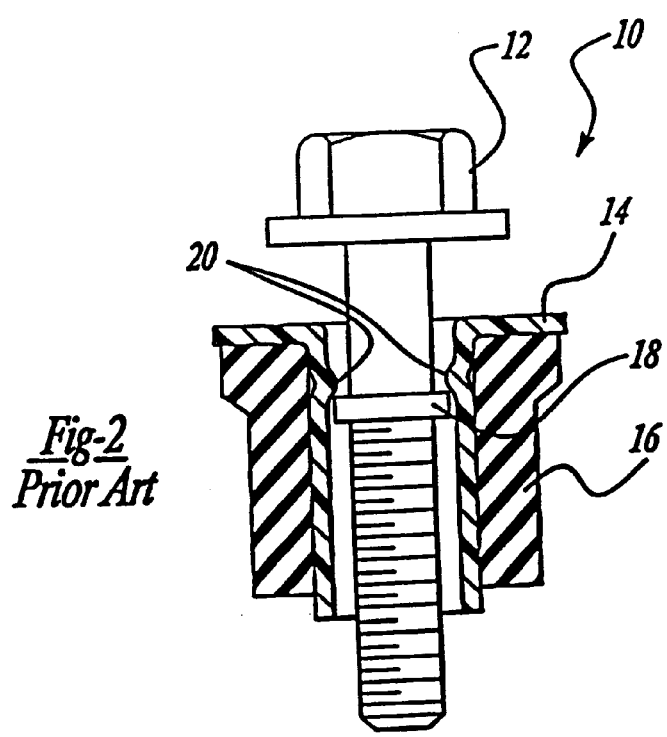
FIG. 2 is a cross-sectional assembled view of FIG. 1.

The workpiece, in the embodiment shown in FIG. 3, takes the form of a washer sleeve 32 having a first non-deformed segment 32a and a second non-deformed segment 32b positioned diametrically opposite to each other. The washer sleeve 32 has an inner bore 34 which is free of the section 20 of pre-formed reduced diameter as required in the prior art example of FIGS. 1 and 2. The upper portions of washer sleeve 32 are formed into a flange 36. The fastener and workpiece of FIG. 3 are in non-retention formation as illustrated by sleeve bore 34 being straight-walled along its length. As such, the fastener 24 can be freely removed from the washer sleeve 32.

Figure 10:
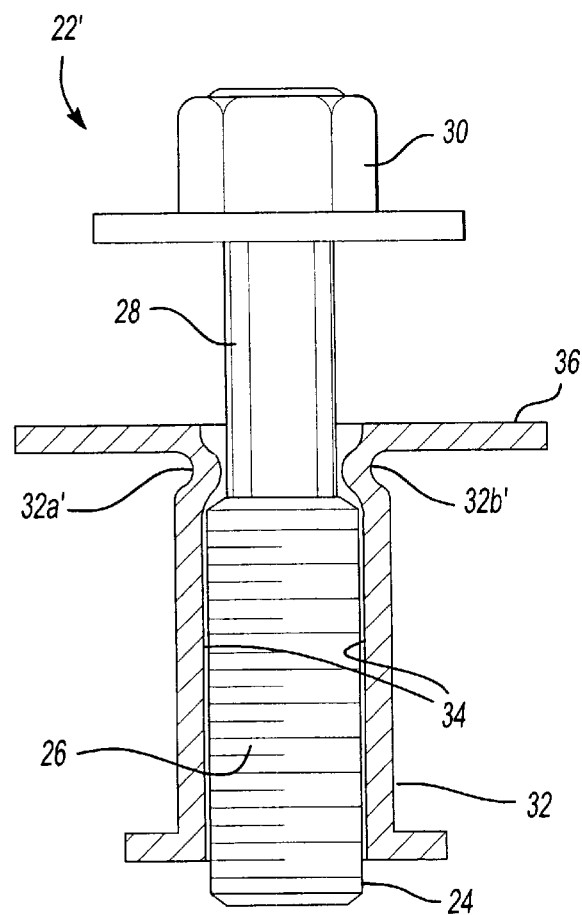
FIG. 10 is a cross-sectional view of a fastener assembly following retention forming procedures according to the principles of the present invention.

FIG. 4 illustrates the fastener assembly 22 of FIG. 3 following captivation procedures according to the principles of the present invention. To obtain the captivated fastener assembly 22' of FIG. 4, the fastener 24 is held in place inside the washer sleeve 32. Predetermined inward compressive forces are then applied to the first non-deformed segment 32a and second non-deformed segment 32b such that they inwardly deform. Thus, the first non-deformed segment 32a is formed into deformed segment 32a'. Likewise, second non-deformed segment 32b is formed into deformed segment 32b'. The deformed segments 32a' and 32b' diametrically oppose each other and provide an inner diameter that is greater than the diameter of the unthreaded portion 28 of the fastener 24, thereby allowing the fastener 24 to move axially relative to the workpiece. However, the inner diameter provided by the deformed segments 32a' and 32b' is less than the diameter of the threaded portion 26 of the fastener 24. As shown in FIG. 10, the outer tips of the threads engage the deformed segments 32a' and 32b' if the fastener 24 moves too far upwardly, thereby preventing the fastener 24 from being removed from the workpiece.

The following table illustrates representative examples of the various dimensions of the components just described:

TABLE 1

| Component Description | Dimension |
| --- | --- |
| Outer diameter of upper unthreaded fastener portion 28 | 5.20 mm |
| Outer diameter of lower threaded fastener portion 26 | 6.00 mm |
| Inner diameter provided by first non-deformed segment 32a and second non-deformed segment 32b | 6.38 mm |
| Inner diameter provided by deformed segments 32a' and 32b' | 5.60 mm |

A grommet (not shown) may also be slid about the outer walls of washer sleeve 32 to complete the assembly 22'.

Special attention should now be directed to the method of assembling the captivated fastener assembly 22'. This method will be described in connection with the remaining figures.

The captivation of the fastener assembly 22' shown in FIG. 4 is preferably accomplished using the assembling apparatus 42 shown in FIG. 5. FIG. 5 illustrates the fastener captivating apparatus 42 according to the principles of the present invention. The assembling apparatus 42 preferably includes a carrying roller 44, a rotating mechanism 46, and a crimping roller 48.

Figure 6:
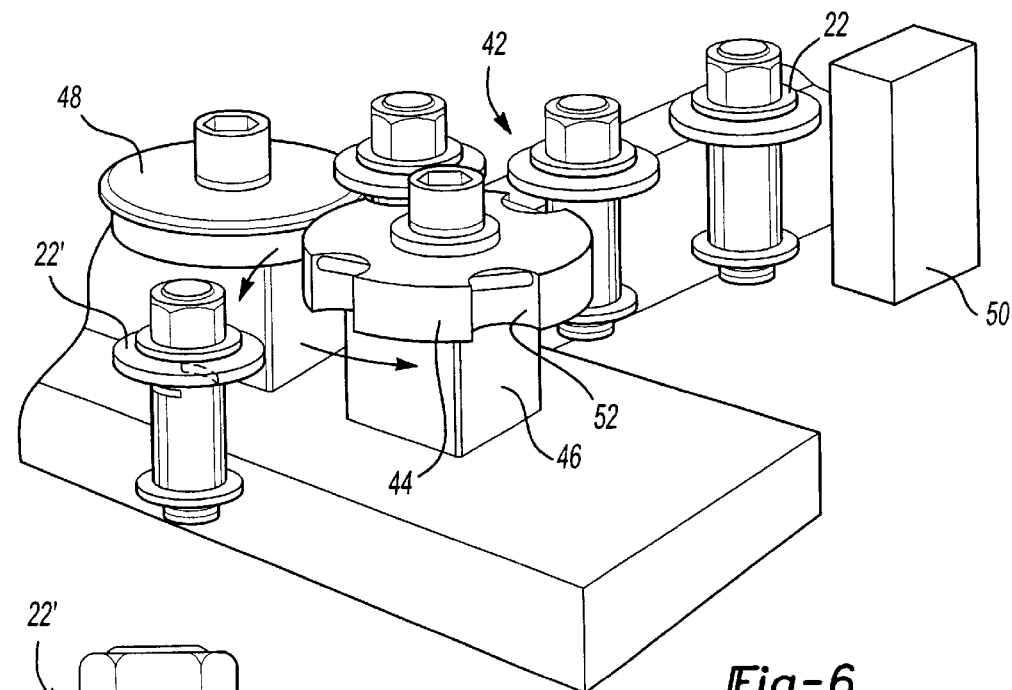
FIG. 6 is a perspective view of the fastener captivating apparatus depicting fastener assembly retention forming procedures according to the principles of the present invention.

As shown in FIG. 6, a feeding mechanism 50 may also be included as part of the assembling apparatus 42. The feeding mechanism 50 is preferably capable of not only sliding the washer sleeve 32 over the lower threaded portion 26 and upper unthreaded portion 28 of the fastener 24 to achieve the non-retention formed assembly 22 shown in FIG. 3, but is also capable of placing each non-retention formed fastener assembly 22 onto the carrying roller 44. Alternatively, these tasks may be accomplished separately. The feeding mechanism 50 is preferably of the automated type, but may be of the manual type.

The carrying roller 44 is generally wheel-shaped and includes pockets 52 formed on its periphery. Each pocket 52 is capable of accepting and supporting a fastener assembly 22. For exemplary purposes, four pockets 52 are disposed on the carrying roller 44. However, it will be appreciated that more than or less than four pockets may be disposed on the carrying roller 44, depending on design requirements.

Figure 8:
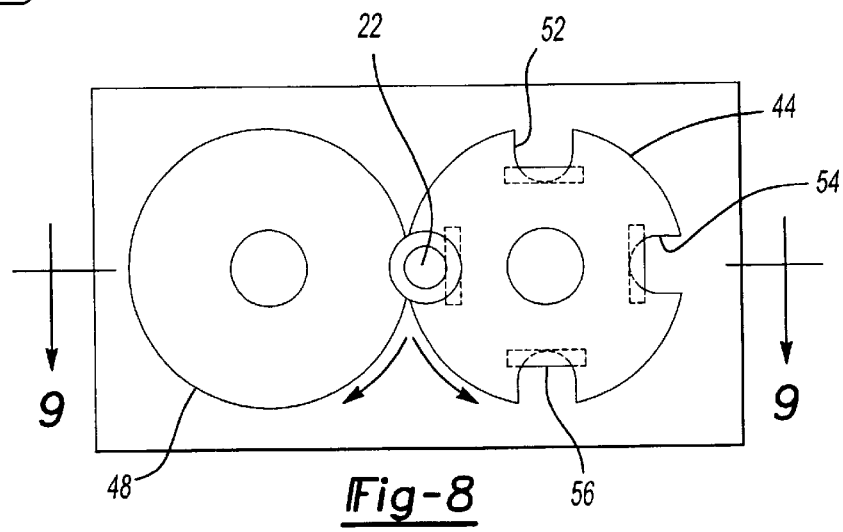
FIG. 8 is a top view of the fastener captivating apparatus of FIG. 5 depicting fastener assembly retention forming procedures according to the principles of the present invention.
Figure 9:
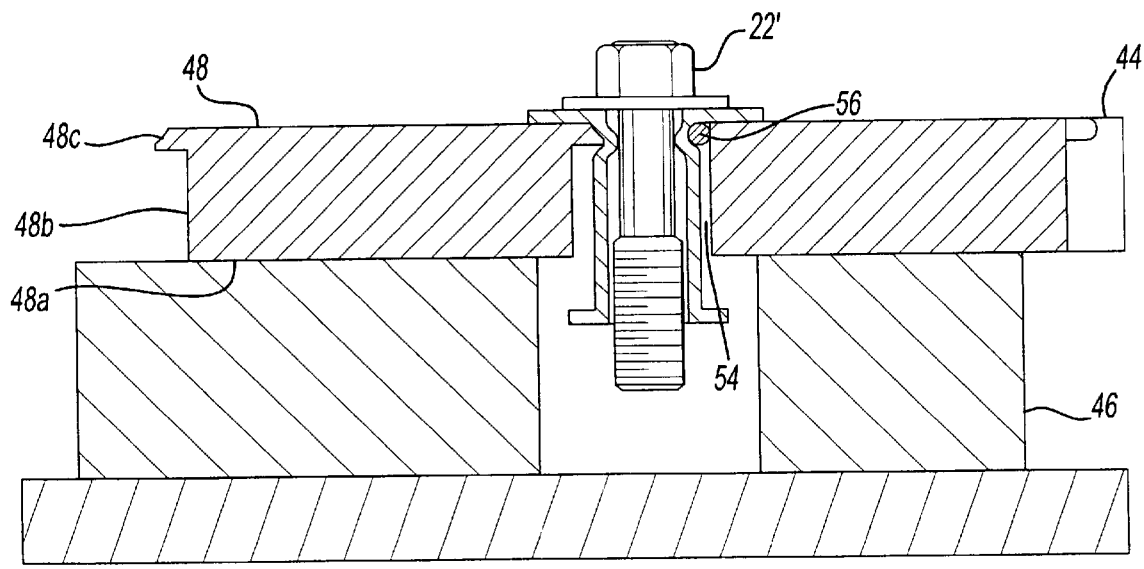
FIG. 9 is a cross-sectional view of the fastener captivating apparatus shown in FIG. 8.

As best shown in FIG. 8, each pocket 52 preferably includes a channel 54 having an arcuate shape that corresponds to the shape of the washer sleeve 32. Alternatively, the channel may have a different shape that is also capable of accepting the fastener assembly 22, such as a triangular or square shape. Each pocket 52 also preferably includes a crimping dowel 56 that is disposed near the top surface of the carrying roller 44 and is inwardly offset from the periphery of the arcuate channel 54. The crimping dowel 56 is preferably made of an inflexible material, such as hardened steel. As shown in FIGS. 8 and 9, the channel 54 and crimping dowel 56 are formed such that when a fastener assembly 22 rests in the pocket 52, a portion of the fastener assembly 22 extends beyond the periphery of the carrying roller 44.

The rotating mechanism 46 is coupled to the carrying roller 44. The rotating mechanism 46 is capable of providing a torque that is sufficient to rotate the carrying roller 44 at a desired rotational speed.

The crimping roller 48 is located adjacently to the carrying roller 44 and is capable of rotation. As shown in FIG. 9, the crimping roller 48 is generally wheel-shaped including a bottom 48a, a side 48b and an annular rim 48c. The annular rim 48c is angularly shaped and extends slightly beyond the edge of the side 48b.

The captivation of the fastener assembly 22 preferably begins by sliding the sleeve 32 over the lower threaded portion 26 and upper unthreaded portion 28 of the fastener 24. As shown in FIG. 6, the feeding mechanism 50 then places each non-retention formed fastener assembly 22 into a pocket 52 of the carrying roller 44. The rotating mechanism 46 provides a torque to the carrying roller 44 such that it rotates, thereby also rotating each non-retention formed fastener assembly 22, as it resides in the pocket 52, toward the crimping roller 48. As such, the non-retention formed fastener assembly 22 is moved into position for deformation procedures.

As shown in FIGS. 8 and 9, once in position for deformation, the annular rim 48c engages the first non-deformed segment 32a of the washer sleeve 32 and applies a predetermined compressive force thereon. This predetermined compressive force is sufficient to inwardly deform the first non-deformed segment 32a, thereby creating deformed segment 32a' (see FIG. 7). The afore-mentioned predetermined compressive force also presses the second non-deformed segment 32b of the washer sleeve 32 against the crimping dowel 56 such that it inwardly deforms, thereby creating deformed segment 32b' (see FIG. 7).

Figure 7:
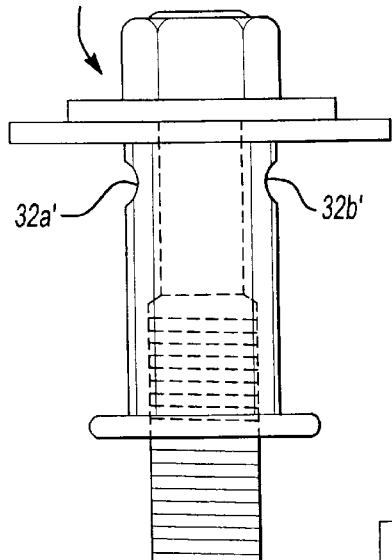
FIG. 7 is a front view of a fastener assembly that has undergone retention forming procedures according to the principles of the present invention.

FIG. 7 shows the deformed segments 32a' and 32b' diametrically opposing each other. However, it will be appreciated by one skilled in the art that additional deformed segments may be created by repeating the above-described process.

As shown in FIG. 6, the carrying roller 44 continues to rotate and the now captivated fastener assembly 22' is removed from the pocket 52. At this time, a grommet (not shown) may be installed around the washer sleeve 32 to complete the assembly.

As shown in FIG. 10, the inner diameter provided by the deformed segments 32a' and 32b' remains greater than the diameter of the unthreaded portion 28 of the fastener such that a free-flowing fit between the deformed segments 32a' and 32b' and the unthreaded portion 28 of the fastener is provided, thereby allowing the fastener 24 to move axially relative to the workpiece 32. However, the inner diameter provided by the deformed segments 32a' and 32b' is less than the outer diameter of the threaded portion 26 of the fastener. Thus, the outer tips of the threads engage the deformed segments 32a' and 32b' if the fastener 24 moves too far upwardly, thereby preventing the fastener 24 from being removed from the workpiece 32. It should now be appreciated that the present invention offers some significant advantages over the commonly used techniques of the prior art. The steps required for forming a fastener protuberance and for consistently maintaining accurate dimensions thereof are avoided, thereby providing cost savings. In addition, the tensile stress gradients at the aperture surface of the washer that are caused by the forcible insertion of the fastener are eliminated. Thus, these tensile stress gradients do not cause the ductility and the fatigue life of this material at the aperture surface to be reduced. In addition, the possibility of deformation of the fastener is reduced. Various other advantages and modifications will become apparent to those skilled in the art after having the benefit of studying the foregoing specification. Therefore, it should be understood that such modifications do not depart from the scope of the invention asdefined by the claims which follow.

What is claimed is:

1. A method of captivating a fastener within a workpiece having a sleeve with an internal bore, the fastener having a threaded shank portion and an unthreaded shank portion each defining a given diameter, said method comprising:
   sliding the workpiece sleeve over the shank of the fastener such that the sleeve slides freely along the length of the fastener thereby forming a fastener pre-assembly;
   inwardly deforming a plurality of segments of the workpiece sleeve to create deformed segments, thereby reducing a portion of the internal bore size of the sleeve to a diameter less than that of the outer tips of the threads of the shank, and
   attaching a grommet to said workpiece sleeve;
   whereby the fastener can move axially relative to said sleeve diameter reduced portion about the unthreaded shank portion while engagement of the threads with the sleeve reduced diameter deformed segments prevents separation of the fastener from the workpiece.

2. The method of claim 1 wherein the workpiece sleeve has a substantially uniform wall thickness.

3. The method of claim 1 wherein the workpiece sleeve has a substantially straight-walled configuration prior to inwardly deforming the plurality of segments of the workpiece sleeve.

4. The method of claim 1 wherein the workpiece sleeve has a radial thickness that is sufficiently thick to prevent deflection of the sleeve diameter reduced portion against said unthreaded shank portion to such an extent that it would prevent axial movement of the fastener relative to the workpiece sleeve.

5. The method of claim 1, which further comprises:
   placing the faster pre-assembly into a pocket of a carrying roller;
   rotating the carrying roller through a restricted region to provide a compressive force on the workpiece sleeve to form said deformed segments.

6. The method of claim 5 wherein said restricted region is defined by an adjacent crimping roller having a rim.

7. The method of claim 6 wherein said carrying roller and crimping roller are mutually rotated to move the Pre-assembly through the restricted region and apply compressive forces to the sleeve to form the deformed segments.

8. The method of claim 7 wherein said pocket contains a dowel whereby compressive forces provided by the rim create a first deformed segment and compressive forces provided by the dowel provide a second deformed segment diametrically opposite the first formed segment.

9. A method of captivating a fastener within a workpiece having a sleeve with an internal bore, the fastener having a threaded shank portion and an unthreaded shank portion each defining a given diameter, said method comprising:
   placing the workpiece sleeve over the shank of the fastener such that the sleeve moves freely along the length of the fastener thereby forming a fastener pre-assembly;
   placing the fastener pre-assembly into a pocket of a carrying roller;
   rotating the carrying roller through a restricted region to provide a compressive force on the workpiece sleeve to reduce a portion of the internal bore size of the sleeve to a diameter less than that of the outer tips of the threads of the shank; and
   whereby the fastener can move axially relative to said sleeve diameter reduced portion about the unthreaded shank portion while engagement of the threads with the sleeve reduced diameter portion prevents separation of the fastener from the workpiece.

10. The method of claim 9 wherein said restricted region is defined by an adjacent crimping roller having a rim.

11. The method of claim 10 wherein said carrying roller and crimping roller are mutually rotated to move the pre-assembly through the restricted region and apply compressive forces to the sleeve to form a plurality of deformed segments.

12. The method of claim 11 wherein said pocket contains a projection whereby compressive forces provided by the rim create a first deformed segment and compressive forces provided by the projection provide a second deformed segment diametrically opposite the first formed segment.

13. The method of claim 12 wherein the projection is provided by a dowel in the pocket.

\* \* \* \* \*